United States Patent
Garsuch et al.

(10) Patent No.: US 9,698,421 B2
(45) Date of Patent: Jul. 4, 2017

(54) ACTIVE CATHODE MATERIAL AND ITS USE IN RECHARGEABLE ELECTROCHEMICAL CELLS

(71) Applicant: BASF SE, Ludwigshafen (DE)

(72) Inventors: Arnd Garsuch, Ludwigshafen (DE); Shinichi Komaba, Kawaguchi (JP); Naoaki Yabuuchi, Urayasu (JP); Hiroaki Yoshida, Hachiouji (JP)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/646,142

(22) PCT Filed: Feb. 3, 2014

(86) PCT No.: PCT/IB2014/058747
§ 371 (c)(1),
(2) Date: May 20, 2015

(87) PCT Pub. No.: WO2014/122566
PCT Pub. Date: Aug. 14, 2014

(65) Prior Publication Data
US 2015/0280235 A1     Oct. 1, 2015

Related U.S. Application Data

(60) Provisional application No. 61/762,972, filed on Feb. 11, 2013, provisional application No. 61/841,444, filed on Jul. 1, 2013.

(51) Int. Cl.
| | |
|---|---|
| *H01M 4/62* | (2006.01) |
| *C01G 53/00* | (2006.01) |
| *H01M 4/505* | (2010.01) |
| *H01M 10/054* | (2010.01) |
| *H01M 4/525* | (2010.01) |
| *H01M 4/131* | (2010.01) |
| *H01M 4/04* | (2006.01) |

(52) U.S. Cl.
CPC ........... *H01M 4/525* (2013.01); *C01G 53/42* (2013.01); *C01G 53/50* (2013.01); *H01M 4/0471* (2013.01); *H01M 4/131* (2013.01); *H01M 4/505* (2013.01); *H01M 4/622* (2013.01); *H01M 4/625* (2013.01); *H01M 10/054* (2013.01); *C01P 2002/76* (2013.01); *H01M 2220/20* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2010/0015256 A1 | 1/2010 | Nam | |
| 2011/0159345 A1* | 6/2011 | Makidera | C01G 49/0027 429/144 |
| 2012/0015256 A1 | 1/2012 | Komaba et al. | |
| 2014/0014873 A1* | 1/2014 | Yabuuchi | C01G 45/1228 252/182.1 |
| 2014/0093778 A1* | 4/2014 | Askit | C30B 29/22 429/231.3 |
| 2015/0194672 A1* | 7/2015 | Barker | C01G 53/42 429/221 |

FOREIGN PATENT DOCUMENTS

| | | |
|---|---|---|
| CN | 1719639 A | 1/2006 |
| CN | 102479951 A | 5/2012 |
| JP | 4813450 B2 | 11/2011 |
| JP | 2012-206925 A | 10/2012 |
| JP | 2012-209242 A | 10/2012 |
| WO | WO 2012/060295 A1 | 5/2012 |
| WO | WO 2014/009710 A1 | 1/2014 |
| WO | WO 2014/009724 A1 | 1/2014 |

OTHER PUBLICATIONS

Certified_Foreign_Priority_Application for Barker et al. (US 20150194672 A1).*
U.S. Appl. No. 14/767,097, filed Aug. 11, 2015, Garsuch, et al.
International Search Report and Written Opinion issued Jun. 11, 2014 in corresponding PCT/IB2014/058747 filed Feb. 3, 2014.
Andreas Jess, et al., "Herstellung von Kohlenstoff-Nanotubes und -fasern durch Gasphasenabscheidung", Chemie Ingenieur Technik, 2006, 78, No. 1-2, 7 pages www.cit-journal.de.
M Sathiya, et al., Synthesis, Structure, and Electrochemical Properties of the Layered Sodium Insertion Cathode Material: $NaNi_{1/3}Mn_{1/3}Co_{1/3}O_2$, Chemistry of Materials, 2012 AMerican Chemical Society, 2012, 24, pp. 1846-1853, pubs.acs.org/cm.
Extonded European Search Report issued Sep. 14, 2016 in Patent Application No. 14748869.6.
Daniel Buchholz et al., "Toward Na-ion Batteries-Synthesis and Characterization of a Novel High Capacity Na Ion Intercalation Material " Chemistry of Materials, vol. 25, No. 2, XP055074526, Jan. 22, 2013, pp. 142-148.
Commun., Yoshida, et al. "P2-type $Na_{frax;2/3}Ni_{1/3}Mn_{2/3-x}Ti_xO_2$ as a new positive electrode for higher energy Na-ion batteries", Chem. Commun., 2014, 50, pp. 3677-3690.
Y. Lei, et al., "Synthesis and Stoichiometry of Different Layered Sodium Cobalt Oxides", Chem. Mater. 2014, 26, 5288-5296.

* cited by examiner

*Primary Examiner* — Patrick Ryan
*Assistant Examiner* — Christopher Domone
(74) *Attorney, Agent, or Firm* — Oblon, McClelland, Maier & Neustadt, L.L.P.

(57) ABSTRACT

The present invention relates to an active cathode material of the general formula (I): $M_xN i_aM^1_bM^2_cO_2$ (I) in which the variables are each defined as follows: M is an alkali metal, $M^1$ is V, Cr, Mn, Fe or Co, $M^2$ is Ge, Sn, Ti or Zr, x is in the range from 0.5 to 0.8, a is in the range from 0.1 to 0.4, b is in the range from 0.05 to 0.6, c is in the range from 0.05 to 0.6, wherein a+b+c=1. The present invention further relates to an electrode material comprising said active cathode material, to electrodes produced from or using said electrode material and to a rechargeable electrochemical cell comprising at least one electrode. The present invention further relates to a process for preparing said active cathode material of the general formula (I).

20 Claims, No Drawings

ACTIVE CATHODE MATERIAL AND ITS USE IN RECHARGEABLE ELECTROCHEMICAL CELLS

The present invention relates to an active cathode material of the general formula (I)

$$M_xNi_aM^1_bM^2_cO_2 \quad (I)$$

in which the variables are each defined as follows:
M is an alkali metal,
$M^1$ is V, Cr, Mn, Fe or Co,
$M^2$ is Ge, Sn, Ti or Zr,
x is in the range from 0.5 to 0.8,
a is in the range from 0.1 to 0.4,
b is in the range from 0.05 to 0.6,
c is in the range from 0.05 to 0.6,
wherein a+b+c=1.

The present invention further relates to an electrode material comprising said active cathode material, to electrodes produced from or using said electrode material and to a rechargeable electrochemical cell comprising at least one electrode. The present invention further relates to a process for preparing said active cathode material of the general formula (I).

Secondary batteries, accumulators or rechargeable batteries are just some embodiments by which electrical energy can be stored after generation and used when required. Due to the significantly better power density, there has been a move in recent times away from the water-based secondary batteries to development of batteries in which the charge transport in the electrical cell is accomplished by lithium ions.

Since the terrestrial abundance of lithium is several magnitudes lower than the abundance of sodium or potassium the development of sodium ion based rechargeable electrochemical cell has started.

US 2012/0015256 describes sodium ion secondary batteries, wherein the active cathode material is for example $NaMn_2O_4$, $NaNiO_2$, $NaFeO_2$, $NaNi_{0.5}Mn_{0.5}O_2$ or $NaCrO_2$.

WO 2012/060295 describes a composite metal oxide consisting of sodium, iron, manganese and oxygen having a P2 structure, wherein this composite metal oxide is an active cathode material for a sodium secondary batteries.

Sathiya et al., Chem. Mater. 2012, 24, 1846-1853 discloses the synthesis, structure and electrochemical properties of the layered sodium insertion cathode material: Na $Ni_{1/3}Mn_{1/3}Co_{1/3}O_2$.

The sodium-ion batteries known from the prior art and their components, in particular the active cathode material, have to be improved with respect to at least one of the following properties: operability at room temperature, discharge capacity, mechanical stability, rate-capability, thermal stability or lifetime of the electrochemical cells or batteries.

This object is achieved by an active cathode material of the general formula (I)

$$M_xNi_aM^1_bM^2_cO_2 \quad (I)$$

in which the variables are each defined as follows:
M is an alkali metal, like Li, Na, K, Rb or Cs, preferably Li or Na, in particular Na.

In one embodiment of the present invention the active cathode material of the general formula (I) is characterized in that M is Na.
$M^1$ is V, Cr, Mn, Fe or Co, in particular Mn.

In one embodiment of the present invention the active cathode material of the general formula (I) is characterized in that $M^1$ is Mn.

$M^2$ is Ge, Sn, Ti or Zr, in particular Ti,

In one embodiment of the present invention the active cathode material of the general formula (I) is characterized in that $M^2$ is Ti.

x is in the range from 0.5 to 0.8, preferably in the range from 0.6 to 0.75,
a is in the range from 0.1 to 0.4, preferably in the range from 0.25 to 0.35, in particular in the range from 0.32 to 0.34,
b is in the range from 0.05 to 0.6, preferably in the range from 0.25 to 0.4, in particular in the range from 0.32 to 0.34,
c is in the range from 0.05 to 0.6, preferably in the range from 0.25 to 0.4, in particular in the range from 0.32 to 0.34,
wherein a+b+c=1.

In a preferred embodiment of the present invention the active cathode material of the general formula (I) is characterized in that the numerical values of 2×a and b+c differ from each other by less than 10%, preferably less than 5% related to the bigger value of these two values.

In one embodiment of the present invention the active cathode material of the general formula (I) is characterized in that M is Na, $M^1$ is Mn, $M^2$ is Ti, a and c are both in the range from 0.32 to 0.34 and b is in the range from 0.32 to 0.34.

The inventive active cathode material of the general formula (I) $M_xNi_aM^1_bM^2_cO_2$, also called active cathode material (A) for short hereafter, preferably has a layered structure, in particular a P2-type layered structure, such as $Na_{0.7}CoO_2$. The structure type can be identified by X-ray diffraction.

In one embodiment of the present invention the active cathode material of general formula (I) is characterized in that the material has a P2-type layered structure identified by X-ray diffraction.

In one embodiment of the present invention the active cathode material of general formula (I) is in the form of particles. Preferably secondary particles of the material have a diameter in the range from 3 to 10 μm. The secondary particles are composed of primary particles of the active cathode material (A) wherein the primary particles preferably have a diameter in the range from 0.5 to 2.0 μm. The particle diameter is understood to mean the mean particle diameter, determined as the volume average. The particles size can be determined according to Transmission Electron Microscopy (TEM) measurement.

The present invention further also provides a process for preparing an active cathode material of the general formula (I)

$$M_xNi_aM^1_bM^2_cO_2 \quad (I)$$

as described above, wherein x is in the range between 0.6 and 0.75 comprising the process steps of
(a) preparation of a mixture of oxides of M, Ni, $M^1$ and $M^2$ or compounds of said metals forming oxides during calcination wherein in said mixture the metals are available in the following molar ratio:
0.6 to 0.75 molar equivalents of M,
0.1 to 0.4, preferably 0.25 to 0.35 molar equivalents of Ni,
0.05 to 0.6, preferably 0.25 to 0.4 molar equivalents of $M^1$, and
0.05 to 0.6, preferably 0.25 to 0.4 molar equivalents of $M^2$,
(b) optionally pelletizing the mixture formed in process step (a)
(c) calcination of the mixture formed in process step (a) or (b) in a temperature range from 300° C. to 1200° C., preferably in a temperature range from 800° C. to 1000° C.

In this process, M, $M^1$ and $M^2$ are each as defined above, especially also with regard to preferred embodiments thereof.

Oxides of M, Ni, $M^1$ and $M^2$ or compounds of said metals forming oxides during calcination are in principle known to the person skilled in the art. Suitable compounds of said metals forming oxides during calcination are for example the corresponding hydroxides, carbonates, acetates, nitrates, sulfates, halides or oxalates.

Preferred alkali metal compounds are $Na_2CO_3$, $NaHCO_3$ or $Na_2O_2$, in particular $Na_2CO_3$. Preferred nickel compounds are $Ni(OH)_2$, $Ni(NO_3)_2$, NiO, $Ni(acetate)_2$, $NiSO_4$ or $Ni(oxalate)$, in particular $Ni(OH)_2$. Preferred manganese compounds are $MnCO_3$, $Mn_2O_3$, $MnO_2$, or $Mn(NO_3)_2$, in particular $MnCO_3$. Preferred titanium compounds are $TiO_2$ or $TiOSO_4$, in particular $TiO_2$. The listed starting compound can comprise water, in certain cases well defined amount of crystallization water.

In process step (a) a mixture of the starting compounds is prepared. Usually the molar ratio of M, Ni, $M^1$ and $M^2$ in the mixture is close to or almost identical with the sought ratio of these metals in the final active cathode material of general formula (I). The starting compounds can be mixed together in pulverous form or together with certain amounts of a liquid dispersion medium. The mixture can be prepared in typical industrial mixers or blenders, like a ball mill, a V-type mixer or a planetary mixer. Preferably the starting compounds are not only mixed together for homogenization but also grinded in order to obtain a very homogenous mixture of these compounds as very fine powder.

In the optional process step (b) the mixture prepared in process step (a) is pelletized in order to simplify the handling of said mixture.

In process step (c) the mixture formed in process step (a) or (b) is calcined in a temperature range from 300° C. to 1200° C., preferably in a temperature range from 800° C. to 1000° C. The time of calcination can be varied in a wide range. Preferably the time of calcination is in the range from 2 hours to 48 hours, more preferably in the range from 6 hours to 18 hours. The calcination step can be performed in an air atmosphere, an inert atmosphere, a reducing atmosphere or an oxidizing atmosphere, depending of the nature of the starting compounds.

The inventive active cathode material of general formula (I) (A) as described above is particularly suitable as component of an electrode material for a rechargeable electrochemical cell. In addition to the active cathode material (A) the electrode material for a rechargeable electrochemical cell comprises carbon in a polymorph comprising at least 60% $sp^2$-hybridized carbon atoms and optionally at least one polymer as a binder.

The present invention further provides an electrode material for a rechargeable electrochemical cell comprising
(A) an inventive active cathode material as described above,
(B) carbon in a polymorph comprising at least 60% $sp^2$-hybridized carbon atoms, and
(C) optionally at least one polymer as a binder.

The inventive electrode material for a rechargeable electrochemical cell comprises, as well as the inventive active cathode material (A), carbon in a polymorph comprising at least 60% $sp^2$-hybridized carbon atoms, preferably from 75% to 100% $sp^2$-hybridized carbon atoms. In the context of the present invention, this carbon is also called carbon (B) for short, and is known as such. The carbon (B) is an electrically conductive polymorph of carbon. Carbon (B) can be selected, for example, from graphite, carbon black, carbon nanotubes, graphene or mixtures of at least two of the aforementioned substances.

In one embodiment of the present invention, carbon (B) is carbon black. Carbon black may, for example, be selected from lamp black, furnace black, flame black, thermal black, acetylene black and industrial black. Carbon black may comprise impurities, for example hydrocarbons, especially aromatic hydrocarbons, or oxygen-containing compounds or oxygen-containing groups, for example OH groups. In addition, sulfur- or iron-containing impurities are possible in carbon black.

In one variant, carbon (B) is partially oxidized carbon black.

In one embodiment of the present invention, carbon (B) comprises carbon nanotubes. Carbon nanotubes (CNTs for short), for example single-wall carbon nanotubes (SW CNTs) and preferably multiwall carbon nanotubes (MW CNTs), are known per se. A process for preparation thereof and some properties are described, for example, by A. Jess et al. in Chemie Ingenieur Technik 2006, 78, 94-100.

In the context of the present invention, graphene is understood to mean almost ideally or ideally two-dimensional hexagonal carbon crystals of analogous structure to single graphite layers.

In a preferred embodiment of the present invention, carbon (B) is selected from graphite, graphene, activated carbon and especially carbon black.

Carbon (B) may, for example, be in the form of particles having a diameter in the range from 0.1 to 100 μm, preferably 2 to 20 μm. The particle diameter is understood to mean the mean diameter of the secondary particles, determined as the volume average.

In one embodiment of the present invention, carbon (B) and especially carbon black has a BET surface area in the range from 20 to 1500 $m^2/g$, measured to ISO 9277.

In one embodiment of the present invention, at least two, for example two or three, different kinds of carbon (B) are mixed. Different kinds of carbon (B) may differ, for example, with regard to particle diameter or BET surface area or extent of contamination.

In one embodiment of the present invention, the carbon (B) selected is a combination of two different carbon blacks.

In one embodiment of the present invention, the carbon (B) selected is a combination of carbon black and graphite.

In addition, the inventive electrode material for a rechargeable electrochemical cell optionally comprises, as well as the inventive active cathode material (A) and the carbon (B), at least one further polymer as a binder, which is also referred to in the context of the present invention as binder (C) for short. Binder (C) serves principally for mechanical stabilization of inventive electrode material.

In one embodiment of the present invention, binder (C) is selected from organic (co)polymers. Examples of suitable organic (co)polymers may be halogenated or halogen-free. Examples are polyethylene oxide (PEO), cellulose, carboxymethylcellulose, polyvinyl alcohol, polyethylene, polypropylene, polytetrafluoroethylene, polyacrylonitrile-methyl methacrylate copolymers, styrene-butadiene copolymers, tetrafluoroethylene-hexafluoropropylene copolymers, vinylidene fluoride-hexafluoropropylene copolymers (PVdF-H FP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers, ethylene-chlorofluoroethylene copolymers, ethylene-acrylic acid copolymers, optionally at least partially neutralized with alkali metal salt or ammonia, ethylene-methacrylic acid copolymers, optionally at least partially neutralized with alkali metal salt or ammonia, ethylene-(meth)acrylic ester copolymers, polyimides and polyisobutene.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

The mean molecular weight $M_w$ of binder (C) may be selected within wide limits, suitable examples being 20 000 g/mol to 1 000 000 g/mol.

In one embodiment of the present invention, the inventive electrode material comprises in the range from 0.1 to 15% by weight of binder, preferably 1 to 8% by weight and more preferably 3 to 6% by weight, based on the total mass of components (A), (B) and (C).

Binder (C) can be incorporated into inventive electrode material by various processes. For example, it is possible to dissolve soluble binders (C) such as polyvinyl alcohol in a suitable solvent or solvent mixture, water/isopropanol for example being suitable for polyvinyl alcohol, and to prepare a suspension with the further constituents of the electrode material. After application to a suitable substrate, the solvent or solvent mixture is removed, for example evaporated, to obtain an electrode composed of the inventive electrode material. A suitable solvent for polyvinylidene fluoride is NMP.

If it is desired to use sparingly soluble polymers as the binder (C), for example polytetrafluoroethylene or tetrafluoroethylene-hexafluoropropylene copolymers, a suspension of particles of the binder (C) in question and of the further constituents of the electrode material is prepared, and pressed together while being heated.

Inventive active cathode materials (A) and inventive electrode materials as described above are particularly suitable as or for production of electrodes, especially for production of cathodes of sodium-containing batteries. The present invention provides for the use of inventive active cathode materials (A) or inventive electrode materials as or for production of electrodes for rechargeable electrochemical cells.

The present invention further provides an electrode which has been produced from or using the inventive electrode material as described above.

In addition, the inventive electrode may have further constituents customary per se, for example an output conductor, which may be configured in the form of a metal wire, metal grid, metal mesh, expanded metal, metal sheet or metal foil, stainless steel being particularly suitable as the metal.

In the context of the present invention, that electrode which has reducing action in the course of discharging (work) is referred to as the cathode.

In one embodiment of the present invention, inventive active cathode material (A) or inventive electrode material is processed to cathodes, for example in the form of continuous belts which are processed by the battery manufacturer.

Cathodes produced from inventive active cathode material (A) or inventive electrode material may have, for example, thicknesses in the range from 20 to 500 μm, preferably 40 to 200 μm. They may, for example, be in the form of rods, in the form of round, elliptical or square columns or in cuboidal form, or in the form of flat cathodes.

The present invention further provides a rechargeable electrochemical cell comprising at least one inventive electrode as described above.

In one embodiment of the present invention, inventive rechargeable electrochemical cells comprise, as well as inventive active cathode material (A) or inventive electrode material, at least one anode, which comprises an alkali metal, preferably lithium or sodium, in particular sodium. The alkali metal, in particular sodium, may be present in the form of pure alkali metal or in the form of an alloy of an alkali metal with at least another metal or in the form of an alkali metal carbon intercalation compound.

In a further embodiment of the present invention, above-described inventive rechargeable electrochemical cells comprise, as well as inventive active cathode material (A) or inventive electrode material, a liquid electrolyte comprising a lithium-containing conductive salt.

In one embodiment of the present invention, inventive rechargeable electrochemical cells comprise, as well as inventive active cathode material (A) or inventive electrode material and a further electrode, especially an electrode comprising sodium, at least one nonaqueous solvent which may be liquid or solid at room temperature and is preferably liquid at room temperature, and which is preferably selected from polymers, cyclic or noncyclic ethers, cyclic or noncyclic acetals, cyclic or noncyclic organic carbonates and ionic liquids.

Examples of suitable polymers are especially polyalkylene glycols, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably doubly methyl- or ethyl-capped polyalkylene glycols.

The molecular weight $M_w$ of suitable polyalkylene glycols and especially of suitable polyethylene glycols may be at least 400 g/mol.

The molecular weight $M_w$ of suitable polyalkylene glycols and especially of suitable polyethylene glycols may be up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (X) and (XI)

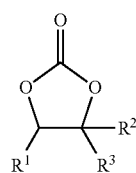

(X)

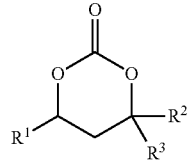

(XI)

in which $R^1$, $R^2$ and $R^3$ may be the same or different and are each selected from hydrogen and $C_1$-$C_4$-alkyl, for example methyl, ethyl, n-propyl, isopropyl, n-butyl, isobutyl, sec-butyl and tert-butyl, where $R^2$ and $R^3$ are preferably not both tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (XII).

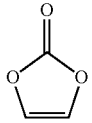

(XII)

Preference is given to using the solvent(s) in what is called the anhydrous state, i.e. with a water content in the range from 1 ppm to 0.1% by weight, determinable, for example, by Karl Fischer titration.

In one embodiment of the present invention, inventive rechargeable electrochemical cells comprise one or more conductive salts, preference being given to sodium salts. Examples of suitable sodium salts are $NaPF_6$, $NaBF_4$, $NaClO_4$, $NaAsF_6$, $NaCF_3SO_3$, $NaC(C_nF_{2n+1}SO_2)_3$, sodium imides such as $NaN(C_nF_{2n+1}SO_2)_2$, where n is an integer in the range from 1 to 20, $NaN(SO_2F)_2$, $Na_2SiF_6$, $NaSbF_6$, $NaAlCl_4$, and salts of the general formula $(C_nF_{2n+1}SO_2)_m XNa$, where m is defined as follows:
m=1 when X is selected from oxygen and sulfur,
m=2 when X is selected from nitrogen and phosphorus, and
m=3 when X is selected from carbon and silicon.

Preferred conducting salts are selected from $NaCF_3SO_3$, $NaC(CF_3SO_2)_3$, $NaN(CF_3SO_2)_2$, $NaPF_6$, $NaBF_4$, $NaClO_4$, and particular preference is given to NaPF6 and $NaCF_3SO_3$ In one embodiment of the present invention, inventive rechargeable electrochemical cells comprise one or more separators by which the electrodes are mechanically separated from one another. Suitable separators are polymer films, especially porous polymer films, which are unreactive toward metallic alkali metal, in particular metallic sodium, and toward the electrolyte in the inventive rechargeable electrochemical cells.

Polyolefin separators, especially of polyethylene or polypropylene, may have a porosity in the range from 35 to 45%. Suitable pore diameters are, for example, in the range from 30 to 500 nm.

In another embodiment of the present invention, the separators selected may be separators composed of PET nonwovens filled with inorganic particles. Such separators may have a porosity in the range from 40 to 55%. Suitable pore diameters are, for example, in the range from 80 to 750 nm.

The inventive rechargeable electrochemical cells can be assembled to rechargeable batteries, preferably rechargeable alkali metal ion batteries, in particular rechargeable sodium ion batteries.

Accordingly, the present invention also further provides for the use of inventive rechargeable electrochemical cells as described above in rechargeable batteries, especially rechargeable sodium ion batteries.

The present invention further provides a rechargeable battery comprising at least one inventive rechargeable electrochemical cell as described above. Inventive rechargeable electrochemical cells can be combined with one another in inventive rechargeable batteries, for example in series connection or in parallel connection. Series connection is preferred.

Inventive electrochemical cells are notable for particularly high capacities, high performances even after repeated charging and greatly retarded cell death. Inventive rechargeable electrochemical cells are very suitable for use in motor vehicles, bicycles operated by electric motor, for example pedelecs, aircraft, ships or stationary energy stores. Such uses form a further part of the subject matter of the present invention.

The present invention further provides for the use of inventive rechargeable electrochemical cells as described above in motor vehicles, bicycles operated by electric motor, aircraft, ships or stationary energy stores.

The use of inventive rechargeable electrochemical cells in devices gives the advantage of prolonged run time before recharging and a smaller loss of capacity in the course of prolonged run time. If the intention were to achieve an equal run time with electrochemical cells with lower energy density, a higher weight for electrochemical cells would have to be accepted.

The present invention therefore also further provides for the use of inventive rechargeable electrochemical cells in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven tackers.

The present invention further provides a device comprising at least one rechargeable electrochemical cell as described above.

The invention is illustrated by the examples which follow but do not restrict the invention.

Figures in percent are each based on % by weight, unless explicitly stated otherwise.

Active cathode materials were characterized by X-ray diffraction and scanning electron microscopy. The structural refinement of active cathode materials was carried out using the diffraction patterns obtained by using an X-ray diffractometer (MultiFlex, Rigaku Co.) with Cu Kα radiation without air exposure by using a laboratory made attachment. The morphological features of samples of active cathode material were observed by using a scanning electron microscope (Carl Zeiss Inc., SUPRA40, Germany).

I. Preparation of Active Cathode Materials

I.1 Synthesis of $Na_{2/3}Ni_{1/3}Mn_{1/3}Ti_{1/3}O_2$ (ACM-1)

The single phase and well crystallized P2-type $Na_{2/3}Ni_{1/3}Mn_{1/3}Ti_{1/3}O_2$ was prepared by solid state reaction. $Na_{2/3}Ni_{1/3}Ti_{1/3}O_2$ was prepared from the stoichiometric amount of $Na_2CO_3$ (purity 99.0%), $MnCO_3$ (purity 94.0%), $Ni(OH)_2$ (purity 99.0%), and $TiO_2$ (purity 99.0%). The precursors were mixed using a ballmill (600 rpm, 12 h). The resulting mixture was pelletized. Thus obtained pellet was then heated at 900° C. for 12 h under an air atmosphere.

I.1.a Characterization of ACM-1

Active cathode materials were characterized by X-ray diffraction and scanning electron microscopy. All of Bragg diffraction lines of ACM-1 were assigned into P2 type layered structure (space group: P6₃/mmc) without any diffraction lines from impurity phases. From SEM images, the size of primary particles is approximately 1 μm.

II. Electrochemical Testing of Active Cathode Materials Assembly and Operation of an Electrochemical Cell Comprising an Electrode Comprising ACM-1 (E-1)

Coin-type cells (2032 type) were assembled to evaluate the electrode performance of ACM-1. Positive electrodes consisted of 80 wt % ACM-1, 10 wt % acetylene black, and 10 wt % poly(vinylidene fluoride), which were mixed with NMP and pasted on Al foil, and then dried at 80° C. in vacuum. Metallic sodium was used as a negative electrode. Electrolyte solution used was 1.0 mol/l NaClO$_4$ dissolved in propylene carbonate (Kishida Chemical Co. Ltd., Japan) with fluorinated ethylene carbonate as an electrolyte additive (2% by wt.). A glass fiber filter (GB-100R, ADVANTEC Co. Ltd., Japan) was used as a separator. The cells were electrochemically cycled at a current density of 12.1 mA/g.

ACM-1 electrodes were tested in a Na cell with different cut-off upper voltages. It delivered approximately 110 mAh/g of discharge capacities with high operating voltage (circa 3.64 V). Good capacity retention was found after 30 cycle test. The reversible capacity for the first cycle increases by raising the cut-off voltage. The operating voltage and capacity retention were much better than that of P2-Na$_{2/3}$Ni$_{1/3}$Mn$_{2/3}$O$_2$ without the Ti substitution for Mn.

The invention claimed is:

1. An active cathode material of the general formula (I)

$$M_xNi_aM^1_bM^2_cO_2 \quad (I)$$

in which the variables are each defined as follows:
M is Na,
M$^1$ is V, Cr, Mn, Fe or Co,
M$^2$ is Ge, Sn, Ti or Zr,
x is in the range from 0.6 to 0.75,
a is in the range from 0.1 to 0.4,
b is in the range from 0.05 to 0.6,
c is in the range from 0.05 to 0.6,
wherein a+b+c=1 and the active cathode material has a P2-type layered structure identified by X-ray diffraction.

2. The active cathode material according to claim 1, wherein M$^1$ is Mn.

3. The active cathode material according to claim 1, wherein M$^2$ is Ti.

4. The active cathode material according to claim 1, wherein M$^1$ is Mn, M$^2$ is Ti, and a, b and c are each independently in the range from 0.32 to 0.34.

5. An electrode material for a rechargeable electrochemical cell comprising
(A) an active cathode material according to claim 1,
(B) carbon in a polymorph comprising at least 60% sp$^2$-hybridized carbon atoms, and
(C) optionally at least one polymer as a binder.

6. An electrode which has been produced from or using an electrode material according to claim 5.

7. A rechargeable electrochemical cell comprising at least one electrode according to claim 6.

8. A rechargeable battery comprising at least one rechargeable electrochemical cell according to claim 7.

9. A method comprising operating a motor vehicle, bicycle operated by electric motor, an aircraft, a ship or a stationary energy store with electrical energy provided by the rechargeable electrochemical cell according to claim 7.

10. A device comprising at least one rechargeable electrochemical cell according to claim 7.

11. A process for preparing an active cathode material of the general formula (I)

$$M_xNi_aM^1_bM^2_cO_2 \quad (I)$$

according to claim 1, wherein x is in the range between 0.6 and 0.75 comprising
(a) preparation of a mixture of oxides of M, Ni, M$^1$ and M$^2$ or compounds of said metals forming oxides during calcination wherein in said mixture the metals are available in the following molar ratio:
0.6 to 0.75 molar equivalents of M,
0.1 to 0.4 molar equivalents of Ni,
0.05 to 0.6 molar equivalents of M$^1$, and
0.05 to 0.6 molar equivalents of M$^2$,
(b) optionally pelletizing the mixture formed in (a)
(c) calcination of the mixture formed in (a) or (b) in a temperature range from 300° C. to 1200° C.

12. The active cathode material according to claim 1, wherein M$^1$ is Mn and M$^2$ is selected from the group consisting of Ge, Sn, and Zr.

13. The active cathode material according to claim 1, wherein M$^1$ is selected from the group consisting of V, Cr, Mn, and Co.

14. The active cathode material according to claim 1, having the P2-type layered structure as a single phase.

15. The active cathode material according to claim 1, further comprising at least one selected from the group consisting of Na$_2$CO$_3$, MnCO$_3$, Ni(OH)$_2$, and TiO$_2$.

16. The active cathode material according to claim 1, having an Na$_{0.7}$Co$_2$ P2-type layered structure.

17. The active cathode material according to claim 1, wherein M$^1$ is Mn; M$^2$ is Ti; x is ⅔; a ⅓; b is ⅓; and c is ⅓.

18. The active cathode material according to claim 1, wherein M$^1$ is Mn and M$^2$ is Ti.

19. The active cathode material according to claim 1, wherein a is in the range from 0.25 to 0.35.

20. The active cathode material according to claim 1, wherein M$^1$ is Mn, M$^2$ is Ti and a is in the range from 0.25 to 0.35.

* * * * *